United States Patent [19]

Pattantyus-Abraham

[11] 4,039,959
[45] Aug. 2, 1977

[54] TWO-TONE DECODER HAVING HIGH NOISE IMMUNITY

[75] Inventor: Tamas I. Pattantyus-Abraham, Pittsburgh, Pa.

[73] Assignee: Westinghouse Electric Corporation, Pittsburgh, Pa.

[21] Appl. No.: 600,557

[22] Filed: July 31, 1975

[51] Int. Cl.² .................... H03K 9/06; H03K 13/24
[52] U.S. Cl. .................................. 328/133; 178/88; 307/233 R; 325/320; 328/140; 340/347 DD
[58] Field of Search ............... 340/347 DD; 325/320; 178/88, 66 R; 329/126, 128; 307/210, 237, 233 R; 328/140, 32, 133

[56] References Cited
U.S. PATENT DOCUMENTS

| 3,223,929 | 12/1965 | Hofstad et al. | 307/210 X |
| 3,307,112 | 2/1967 | Clark | 325/320 UX |
| 3,315,094 | 4/1967 | Mills | 307/237 |
| 3,353,102 | 11/1967 | Meyers et al. | 325/320 |
| 3,412,205 | 11/1968 | Saeger | 178/88 X |
| 3,581,220 | 5/1971 | Bell et al. | 178/66 R X |
| 3,746,993 | 7/1973 | Ahmed et al. | 325/320 |
| 3,801,918 | 4/1974 | Milne et al. | 178/88 X |

OTHER PUBLICATIONS

Analog Devices, Inc., ANALOG-DIGITAL CONVERSION HANDBOOK, 6/1972, pp. III-32, 33.

Primary Examiner—Thomas J. Sloyan
Attorney, Agent, or Firm—R. W. Smith

[57] ABSTRACT

A decoder for converting a frequency coded digital input signal into a binary output signal. The decoder includes circuitry which detects when the input signal consists of the proper tones. When these tones are present, the decoder circuitry converts the tone signals into constant amplitude squarewave signals. The squarewave signals are then attenuated and integrated, and these two signals are offset and applied to a comparator. The resulting signal from the comparator is in the form of a pulse signal having rectangular pulses of constant amplitude and width, with the repetition rate of the pulses being equal to the corresponding tone frequency. The rectangular pulse signal is filtered and converted into a binary signal having binary levels which correspond to the average value of the filtered pulse signal with respect to an adjustable reference value. The noise response of the decoder is dependent upon the energy in a noise signal rather than just the amplitude, thus the decoder is highly immune to false decoding due to short noise pulses.

8 Claims, 6 Drawing Figures

TWO-TONE DECODER HAVING HIGH NOISE IMMUNITY

BACKGROUND OF THE INVENTION

1. Field of the Invention

This invention relates, in general, to frequency-to-binary converters and, more specifically, to decoders for two-tone communication systems.

2. Description of the Prior Art

Communication systems which are used to transmit signals along power distribution lines are susceptible to high noise conditions. Consequently, such communication systems are designed to be reliable when operating under very adverse signal-to-noise ratio conditions. When the information to be transmitted can be coded in digital form and the maximum base band information rate is several orders of magnitude below the carrier frequency of the communication system, the use of a two-step frequency modulation method greatly reduces the effects of the noise at the power line frequency and at its harmonics, thus enhancing the reliability of the communication system. A communication system using this technique is disclosed in U.S. Pat. No. 3,967,264, issued June 29, 1976 which is assigned to the assignee of this invention.

Communication systems of the type which use two-tone signals employ a decoder which processes the two-tone signals and converts the information contained therein into binary form. Some conventional decoders employ monostable multivibrator circuits which are triggered to produce a pulse signal having pulses of constant amplitude and width. Since monostable circuits are very sensitive to noise, primarily because they are triggered pulse circuits, noise pulses of short duration can be detrimental to the ability of the decoder to properly generate the desired binary signal.

Therefore, it is desirable, and it is one of the objects of this invention, to provide a two-tone decoder for converting a two-tone frequency coded signal into a binary output signal which is highly immune to noise, and which does not use a monostable multivibrator circuit which is responsive to pulses of short duration.

SUMMARY OF THE INVENTION

There is disclosed herein a new and useful two-tone decoder for converting a frequency coded input signal into a binary output signal. The decoder includes a tone amplitude detector which processes the input signal and activates the decoder when a two-tone signal is being received. When a proper two-tone signal is not being received, the decoder is placed in an inoperative condition so that the probability of producing an inaccurate output signal due to noise pulses is reduced.

The two-tone frequency coded input signal is converted by the decoder into a squarewave signal of constant amplitude which has a frequency equal to the frequency of the tones in the analog input signal. The squarewave signal is then attenuated and integrated by separate circuits in the decoder. The attenuated squarewave signal and the integrated signal are compared to each other after the average values of these signals are offset from each other. When the amplitude of the integrated signal is greater than the amplitude of the attenuated squarewave signal, the output level of the comparing circuit changes. The signal from the comparing circuit has the characteristics of a pulse signal having rectangular pulses of constant amplitude and width. These rectangular pulses have a repetition rate which is identical to the frequency of the corresponding tone in the frequency coded input signal.

The constant amplitude and width pulse signal is filtered by the decoder to produce a filtered signal which has amplitudes corresponding to the average values of the pulse signal. When the filtered signal decreases below a certain reference value, a binary output signal acquires one distinct level. When the filtered signal increases above another certain reference value, the binary output signal acquires another definite level. Thus, the binary output signal is a function of the average value of the constant amplitude and width pulse signal generated by comparing the integrated signal with the offset attenuated squarewave signal.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
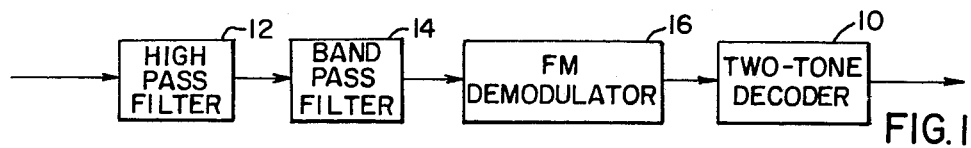
FIG. 1 is a block diagram of a carrier communications receiver constructed according to this invention.

Throughout the following description, similar reference characters refer to similar elements or members in all of the figures of the drawing.

Referring now to the drawing, and to FIG. 1 in particular, there is shown a block diagram of a portion of a communication system utilizing the two-tone decoder 10 which is constructed according to the teachings of this invention. The modulated carrier signal containing the transmitted intelligence is applied to the high pass filter 12 which eliminates some of the low frequency noise from the received signal. The signal is then applied to the band pass filter 14 which attenuates the frequencies contained in the carrier signal which are above and below the desired frequencies. The signal is then applied to the frequency modulation demodulator 16 which converts the carrier signal back into the original modulating signal which, ideally, consists of a sequence of two discrete tones within the audio frequency spectrum. For example, the frequencies of 1 kHz and 2 kHz may be used for application to the two-tone decoder 10.

Figure 2:
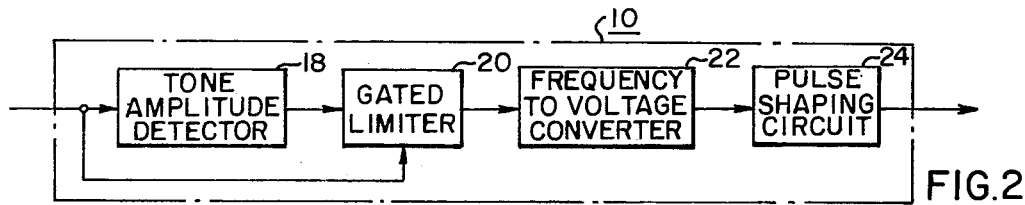
FIG. 2 is a block diagram of the two-tone decoder shown in FIG. 1 and constructed according to this invention.

FIG. 2 is a block diagram of the two-tone decoder 10 illustrated in FIG. 1. The audio tones are applied to both the tone amplitude detector 18 and the gated limiter 20. When the proper tones are detected by the tone amplitude detector 18, the gated limiter 20 is gated for operation and the remaining stages of the two-tone decoder function normally. However, when neither of the two-tone signals is applied to the tone amplitude detector 18, the gated limiter 20 is turned off and does not permit additional processing of the input signal.

Thus, when the proper two-tone signal is not being applied to the two-tone decoder 10, the two-tone decoder 10 is rendered inoperative rather than attempting to detect the noise signal which would normally be applied to the two-tone decoder 10 when the two-tone signal is not present. Therefore, the chances of producing an extraneous output signal from the two-tone decoder 10 due to input signal noise is reduced substantially by the squelch action provided by the amplitude detector 18.

The gated limiter 20 converts the sinusoidal two-tone signal applied to the two-tone decoder 10 into a squarewave having a constant amplitude. The frequency of the squarewave is the same as the frequency of the sinusoidal tone signal applied to the two-tone decoder 10. The frequency-to-voltage converter 22 changes the squarewave signal, which has a definite frequency, into a voltage which is proportional to the frequency of the squarewave signal. Thus, since two different tones are applied to the two-tone decoder 10, the voltage output of the frequency-to-voltage converter 22 will have an output consisting of different voltage levels which correspond to the frequencies of the input signal. The pulse shaping circuit 24 converts the varying voltage from the frequency-to-voltage converter 22 into a binary signal which has only two voltage levels. Thus, each of the two tones applied to the two-tone decoder 10 is represented by a definite output voltage from the pulse shaping circuit 24.

Figure 3:
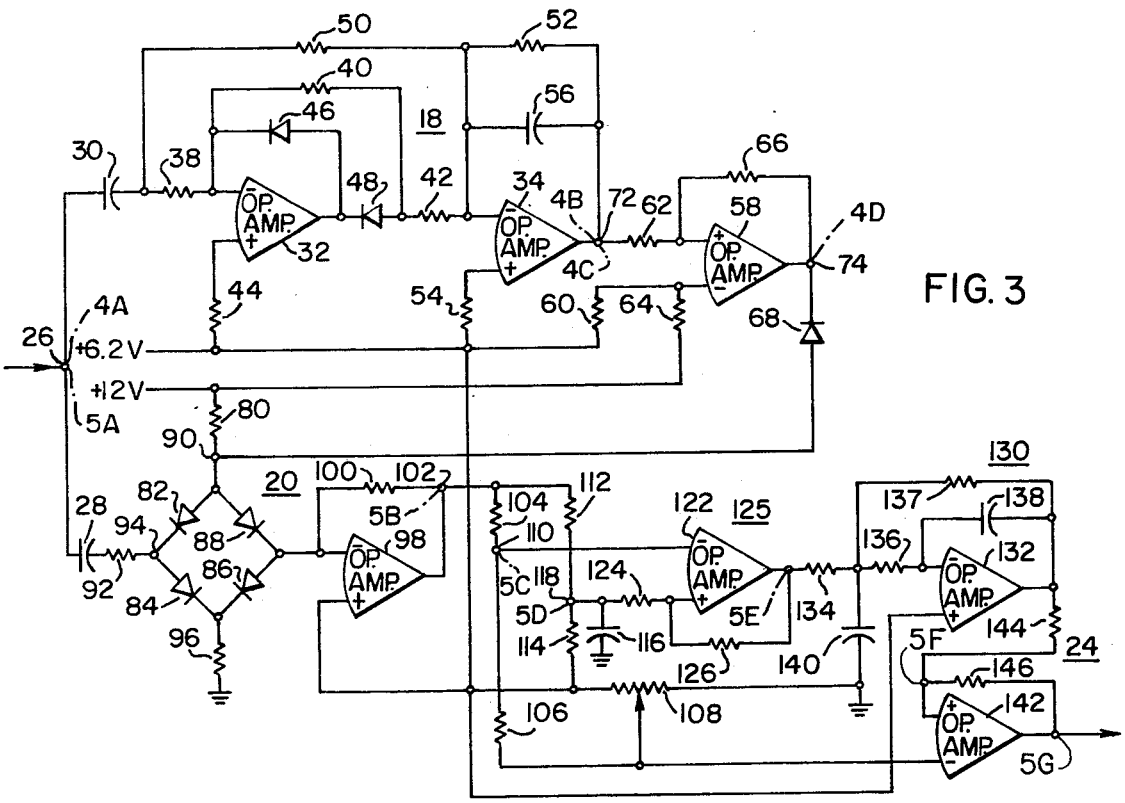
FIG. 3 is a schematic diagram of the two-tone decoder shown in FIG. 2.

FIG. 3 is a schematic diagram of a two-tone decoder constructed according to a specific embodiment of this invention. Although other circuit arrangements may be used to provide signal processing according to this invention, the circuit shown in FIG. 3 is illustrative of a preferred embodiment which may be used to process the signals as defined in the claims.

The input audio signal is applied between the terminal 26 and a ground terminal which is not shown. The input signal is applied simultaneously to the gated limiter 20 and to the tone amplitude detector 18 through the coupling capacitors 28 and 30. Full-wave rectification of the applied input signal is provided generally by the operational amplifier 32, the resistors 38, 40, 44 and 50, and the diodes 46 and 48. A filtering circuit comprising generally the resistors 42, 52 and 54, the operational amplifier 34, and the capacitor 56 filters the full-wave rectified input signal. The output from the filtering circuit is applied to a voltage comparator which generally consists of the operational amplifier 58, the resistors 60, 62, 64 and 66 and the diode 68.

Figure 4:
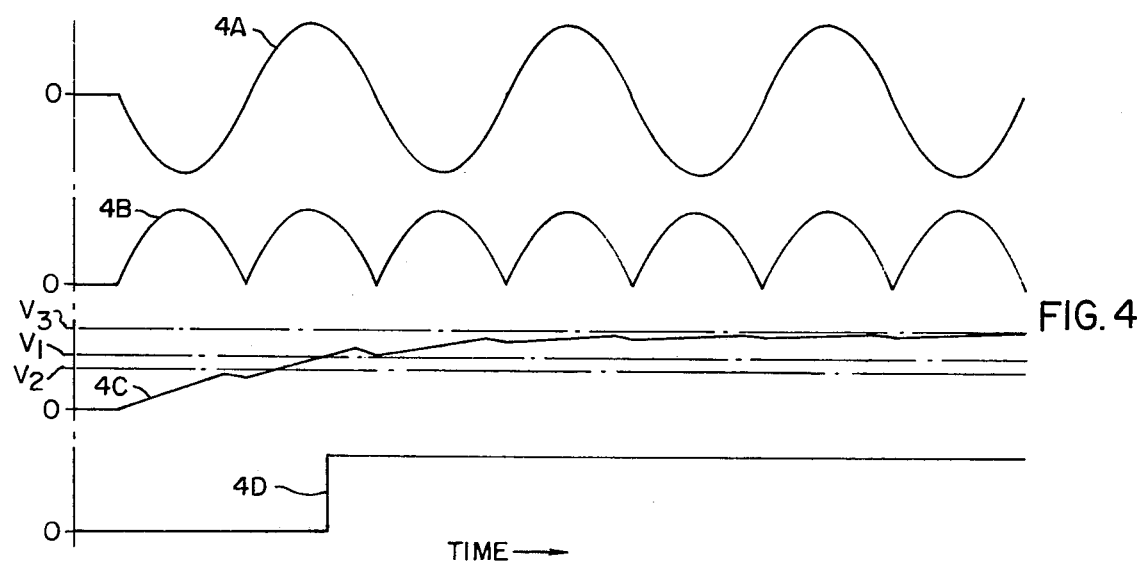
FIG. 4 illustrates signal graphs which may occur within the tone amplitude detector portion of the two-tone detector.

FIG. 4 illustrates four signal graphs which may exist in the tone amplitude detector 18 when a suitable signal is applied to the two-tone decoder. The locations at which voltages would exist which correspond to the graphs 4A, 4B, 4C and 4D in the circuit of FIG. 3 are indicated by similar designators in FIG. 3. Therefore, assuming that a tone frequency represented by the graph 4A is applied to the terminal 26, a full-wave rectified voltage represented by graph 4B would be produced at terminal 72 if capacitor 56 was not connected. The tone producing the graph 4A could be either of the two tones which comprise the two-tone input signal to the decoder.

The full-wave rectified signal according to graph 4B is filtered, when the capacitor 56 is connected as shown, to produce the filtered signal represented by graph 4C which exists at the terminal 72. A constant DC voltage produced by voltage divider resistors 60 and 64 is applied to the inverting terminal of the operational amplifier 58, and the filtered signal represented by graph 4C is applied to the non-inverting terminal of the operational amplifier 58 which is connected to operate as a comparator. Before the voltage indicated by graph 4C acquires the level $V_1$, the difference between the input voltages to the comparator circuit is insufficient to apply a positive output voltage at the output terminal 74 of the operational amplifier 58. Thus, the diode 68 is connected to near ground potential at the terminal 74. However, when the voltage indicated by the graph 4C increases above the level $V_1$, the input to the operational amplifier 58 is such that the output of the operational amplifier becomes positive, thereby removing the near ground from the diode 68 and preventing conduction of current therethrough.

The components of the voltage comparator circuit are arranged to provide some hysteresis in order to prevent any small changes in the voltage represented by graph 4C from causing the operational amplifier 58 to change its state. Thus, once the level $V_1$ has been exceeded, the voltage represented by the graph 4C must decrease below the level $V_2$ before the output terminal 74 again becomes near ground. $V_3$ is the maximum voltage which will exist at the terminal 72 when the input signal maintains the same frequency and amplitude for a substantial amount of time. The voltage at the terminal 74, indicated by the graph 4D, represents the potential change of the terminal 74 with respect to ground as the voltage represented by graph 4C increases.

When the terminal 74 is at a sufficient positive potential, the voltage difference across the diode 68 is insufficient to cause current to flow through the resistor 80 of the gated limiter 20. Thus, sufficient operating voltage is applied to the bridge circuit consisting of the diodes 82, 84, 86 and 88. However, when the output of the operational amplifier 58 is such that the terminal 74 is near ground potential, almost the entire 12-volt supply voltage is dropped across the resistor 80 and prevents sufficient operation of the bridge circuit in transferring the incoming tone signals to the other stages of the two-tone decoder. Thus, the limiter 20 is gated by the tone amplitude detector 18 which is connected through the diode 68 to the terminal 90 of the gated limiter 20.

Normally, the input signal to the terminal 26 consists of a sequence of two different tones. Either tone is sufficient to gate the limiter stage 20 for transfer of the audio signal to the other stages of the two-tone decoder 10. Operation of these portions of the two-tone decoder will be described in connection with an input signal containing a sequence of tones having two different frequencies.

Figure 5:
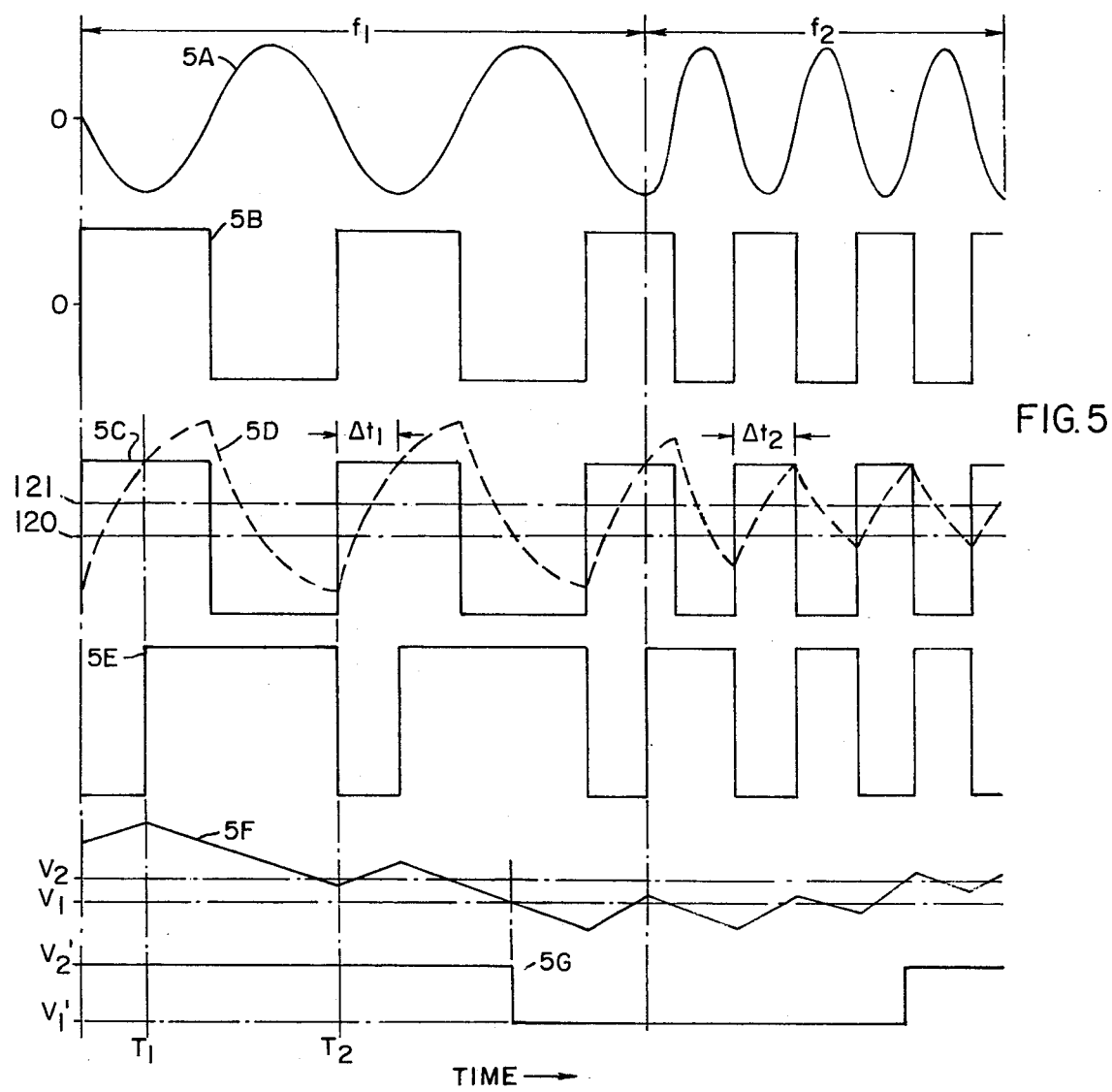
FIG. 5 illustrates signal graphs occurring within the two-tone decoder shown in FIG. 3.

FIG. 5 illustrates various graphs of voltages or signals which exist in the two-tone decoder when the applied signal has the waveform indicated by the graph 5A. The first few cycles of the input signal has a frequency of $f_1$ which, for illustrative purposes, may be 1 kHz. The remaining portion of the input signal shown by graph 5A has a frequency of $f_2$, which may be 2 kHz. Assuming that this signal is applied to the input terminal 26 of the two-tone decoder 10, the voltages at various locations within the other circuits of the two-tone decoder are illustrated by the graphs 5B, 5C, 5D, 5E, 5F and 5G.

Referring to both FIGS. 3 and 5, it can be seen that the input signal voltage is applied across the coupling capacitor 28 and the resistor 92 to the bridge circuit consisting of diodes 82 84, 86 and 88. The input signal is alternating between positive and negative potentials with respect to ground potential. When the input signal applied to the terminal 94 is at a potential of +6.2V with respect to ground, the current through each diode is equal and is limited mainly by the resistors 80 and 96. When the input voltage increases positively with respect to +6.2V, the diodes are biased in such a condition that less current flows through the diodes 82 and 86 and more current flows through the diode 84. Since the non-inverting terminal of the operational amplifier 98 is connected to a source of fixed potential, the inverting terminal of the operational amplifier 98, in its linear mode of operation, maintains a constant potential equal to that at the non-inverting terminal (+6.2V). Thus, the change in the currents through the other diodes causes a current increase through the diode 88 which is transferred around the operational amplifier 98 by the resistor 100. Therefore, the output terminal 102 acquires a positive potential with respect to ground when the input signal has a positive polarity with respect to +6.2V.

When the input voltage is positive enough, no current can flow through diodes 82 and 86, consequently all current flowing through resistor 80 flows into the inverting terminal or node of the operational amplifier 98. Since the input impedance at the inverting node is high, since almost all of the current to the inverting node is carried away through resistor 100, and since the operational amplifier 98 has very high gain, the slightest voltage difference between the inverting and non-inverting nodes will cause large changes at the output terminal 102. Thus, in response to currents as described above, the output of the operational amplifier 98 becomes more negative than the reference voltage (+6.2V).

The current through the resistor 80 is limited by its value and by the voltage difference across it. The current through resistor 100 defines the output voltage of the operational amplifier 98 and, by the proper choice of values for the resistors 108 and 100 can be avoided even when no further current increase into the inverting node is caused by the increasing output voltage. Thus, before the limiting state is reached, the operational amplifier 98 has a high gain factor determined by the ratio of resistors 100 and 92. In the limiting state, the output voltage is given by $E_0 = 6.2 - (12 - 6.2 - 0.65) R_{100}/R_{80}$ where 12 V is the supply voltage, 6.2V is the reference voltage, and 0.65V is the typical forward voltage drop across a silicon signal diode.

For signals decreasing at point 94, the conduction in the limiting state is through diodes 82 and 86, and current is flowing out of the inverting node. Consequently, the output of operational amplifier 98 is positive. It has been demonstrated that these elements perform signal limiting without causing the operational amplifier 98 to work near to or in its non-linear range. The response of the limiter to a signal according to graph 5A is shown by graph 5B. Therefore, the squarewave signal indicated by the graph 5B has a peak-to-peak amplitude which is substantially constant for a wide range of amplitudes of the input signal, and the frequency of the squarewave signal is the same as the frequency of the input signal shown by graph 5A.

The squarewave signal illustrated by graph 5B is attenuated by the voltage divider consisting of the resistors 104 and 106 to produce a voltage at the terminal 110 which corresponds to the graph 5C. The average or zero value of the squarewave signal represented by graph 5C is offset or shifted from the average value of the squarewave signal indicated by the graph 5B due to the introduction of a fixed positive potential with respect to ground, across the voltage divider by the variable resistor 108.

The squarewave signal indicated by the graph 5B is applied to an integration circuit which consists essentially of the resistors 112 and 114, and the capacitor 116. The result of the integration produces a voltage corresponding to the graph 5D which exists at the terminal 118. Due to the offsetting of the average value of the attenuated squarewave signal indicated by graph 5C, the average value of the voltages represented by the graph 5C and 5D are shifted or offset from each other. Line 120 represents the average or zero axis for the graph 5C and the line 121 represents the zero axis for the graph 5D. Variation of the amount of offsetting is determined by the adjustment of the single variable resistor 108 and is adjusted, during the alignment of the two-tone decoder, to a position which provides the best operation.

The attenuated squarewave signal and the integrated signal are applied to a comparator circuit 125 which consists generally of the operational amplifier 122 and the resistors 124 and 126. Since the output of the comparator is dependent upon the voltage difference between the input terminals of the operational amplifier 122, the output signal is responsive to the relative amplitudes between the attenuated squarewave signal 5C and the integrated signal 5D. When the integrated signal amplitude is larger than the amplitude of the attenuated squarewave signal 5C, the output of the comparator is positive with respect to ground potential. Due to the high gain of the operational amplifier 122 and to the maximum positive voltage it is limited to, a slight difference in voltage between the input terminals of the operational amplifier 122 produces an output voltage equal to the maximum output voltage from the operational amplifier. The same type of output response occurs when the integrated signal amplitude decreases below the amplitude of the attenuated squarewave signal 5C, except that the output of the operation amplifier 122 goes negative.

The graph 5E represents the rectangular output signal from the comparator 125. It can be seen that the graph 5E acquires a positive amplitude at time $T_1$ when the integrated signal 5D has a higher amplitude than the attenuated squarewave signal 5C. The signal represented by the graph 5E maintains this level until the amplitude of the attenuated squarewave signal 5C becomes greater than the amplitude of the integrated signal 5D at time $T_2$. At this instant, the signal represented by the graph 5E acquires a negative output polarity with respect to ground potential.

The comparator output signal 5E is in the form pf a pulse signal having negative going rectangular pulses of constant amplitude and width, since the duration of the negative going pulses is constant when the integrated signal 5D and the attenuated squarewave signal 5C are properly offset. Proper offsetting is obtained when the amplitude of the integrated signal 5D is less than the amplitude of the attenuated squarewave signal 5C during the time interval $\Delta t_1$, which is equal to one-half cycle of the squarewave signal at the higher frequency $f_2$ and is also equal to the time interval $\Delta t_2$ of the higher frequency portion of the attenuated squarewave signal. Thus, when properly adjusted, the pulse signal 5E contains negative going rectangular pulses of constant amplitude and width which have a repetition range which is the same as the frequency range of the corresponding input signal 5A.

The pulse signal 5E is applied to a low pass filter circuit 130 which generally comprises the operational amplifier 132, the resistors 134, 136, and 137, and the capacitors 138 and 140. The low pass filter circuit averages the rectangular pulse signal 5E and produces the filtered signal 5F which is inverted from the input signal 5E by the operational amplifier 132. Thus, when the pulse signal 5E acquires a positive amplitude, the amplitude of the filtered signal 5F begins to decrease, such as at time $t_1$. Similarly, when the amplitude of the rectangular pulse signal 5E becomes negative, the amplitude of the filtered signal begins to increase, such as at time $T_2$.

The filtered signal 5F is applied to the pulse shaping circuit 24 which consists generally of the operational amplifier 142 and the resistors 144 and 146. The pulse shaping circuit 24 provides a binary output signal 5G according to the amplitude level of the filtered signal 5F. It is to be understood that in FIG. 5 the initially high level of signal 5F is established by the signal 5A previously having a frequency of $f_2$. Due to the hysteresis characteristics of the pulse shaping circuit 24, two reference values determine the amplitudes of the filtered signal 5F at which the binary output signal 5G changes its output voltage. The filtered signal 5F must decrease below the reference value $V_1$ to make the value of the output signal 5G equal to $V_1'$ which is a first binary level representing the frequency $f_1$. Similarly, the amplitude of the filtered signal 5F must then increase above the reference value $V_2$ before the output signal 5G acquires the voltage value $V_2'$ which is a second binary level representing the frequency $f_2$. Therefore, the slight fluctuations in the filtered signal 5F are not reflected as a change in state of the binary output signal 5G.

The reference values $V_1$ and $V_2$ are determined by the setting of the variable resistor 108 which applies a variable voltage to the inverting terminal of the operational amplifier 142. With proper circuit component values for the two-tone decoder 10, the optimum values for the reference values $V_1$ and $V_2$ will occur at the same time the attenuated squarewave signal 5C is properly offset from the integrated signal 5D. Thus, adjustment of the single variable resistor 108 provides the two adjustments necessary for proper alignment of the two-tone decoder. This adjustment is indicated by a transition from one binary output level at approximately the midfrequency range of the input signal. When the input signal consists of tones having a frequency of 1 kHz and 2 kHz, the proper transition point would be approximately 1.5 kHz.

Figure 6:
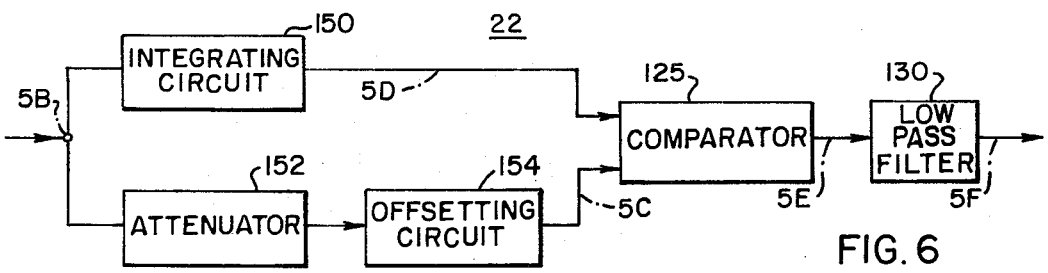
FIG. 6 is a block diagram of a portion of the two-tone decoder shown in FIG. 3.

FIG. 6 is a block diagram illustrating the functions performed by the frequency-to-voltage converter 22. The squarewave signal 5B is applied to the integrating circuit 150 to produce the integrated signal 5D which is applied to the comparator 125. The squarewave signal 5B is also applied to the attenuator 152 and to the offsetting circuit 154 to produce the attenuated squarewave signal 5C which is also applied to the comparator 125. The signals are processed by the comparator 125 to provide the constant amplitude and width rectangular pulse signal 5E which is processed by the low pass filter to produce the filtered signal 5F.

By constructing a two-tone decoder as disclosed herein, detection of a two-tone signal can be obtained with relatively simple adjustments and with high immunity to short noise pulses. Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

What is claimed is:

1. A decoder for receiving a two-tone input signal having first and second frequencies representative of binary coded intelligence and converting said intelligence into a correspondingly coded binary output signal, said decoder comprising:
    limiting means for producing a squarewave signal responsive to the input signal, said squarewave signal having a constant peak-to-peak amplitude and first and second frequencies which are the same as the first and second frequencies of the input signal tones;
    integrating circuit means receiving said squarewave signal and producing an integrated signal responsive to the integral of each cycle of the squarewave signal at said first and second frequencies;
    offsetting circuit means for offsetting the average value references axes of the squarewave signal and of the integrated signal with respect to each other by a predetermined amount such that said integrated signal is less positive than said squarewave signal for different portions of each complete cycle of said squarewave signal when the signals change between said first and second frequencies;
    means for comparing the amplitudes of the integrated signal relative to the amplitudes of the squarewave signal during each cycle thereof, said comparing means producing a rectangular pulse signal having a substantially constant amplitude between first and second levels produced when said integrated signal is more and less positive, respectively, than said squarewave signal, said rectangular pulse signal having the same two repetition rates as the squarewave signal at said first and second frequencies;
    low pass filter means for filtering the rectangular pulse signal to produce a filtered signal having varying amplitudes responsive to changes in the average values of the rectangular pulse signal when occurring at the two repetition rates; and
    pulse shaping means for producing a binary output signal having first and second voltage levels responsive to the filtered signal varying amplitudes occurring with changes between the two repetition rates of said rectangular pulse signal.

2. The decoder of claim 1 including squelch means for rendering the limiting means inoperative when the squelch means does not receive the input signal above a predetermined amplitude for a predetermined length of time.

3. The decoder of claim 1 including attenuation circuit means wherein the integrating circuit means, the attenuation circuit means, and the offsetting circuit means comprise:
    an input terminal to which the squarewave signal is applied;
    a first impedance network having three terminals, with a first of said terminals connected to said input terminal, a second of said terminals connected to adjustable means for providing a potential which is different than ground potential, and a third of said terminals being connected through a first impedance to the first terminal and being connected through a second impedance to the second terminal, said third terminal being connected to one input of the comparing means to apply the squarewave signal with a predetermined level of attenuation to said one input; and a second impedance network having three terminals, with a first of said terminals connected to said input terminal, a second of said terminals connected to a point of fixed potential and through a third impedance to the first terminal, and a third of said terminals being connected through a fourth impedance to the second terminal and through a capacitor to ground and to another input of the comparing means to apply the integrated signal to said another input.

4. The decoder of claim 1 including attenuation circuit means connected between said limiting means and said integrating circuit means for decreasng the squarewave signal to a predetermined peak-to-peak amplitude so that the components of said attenuation circuit means, of said integrating circuit means and of said offsetting circuit means are effective to produce said integrated signal less positive than said squarewave signal for one-half cycle at said second frequency and produce the rectangular pulse signal at the comparing means with a pulse width substantially equal to one-half cycle of said squarewave signal.

5. The decoder of claim 4, wherein the frequency of said second frequency is in the order of twice the frequency of said first frequency.

6. The decoder of claim 4, wherein the first frequency of the input signal is less than the frequency of said second frequency, and at the first frequency the integrated signal is less positive than the squarewave signal for time interval substantially equal to the time interval of one-half cycle of a squarewave signal having the second frequency so that said rectangular pulse signal has substantially the same pulse width at either of the two repetition rates.

7. The decoder of Claim 1, wherein said binary output signal means includes:

means for filtering the pulse signal to produce a filtered signal having fluctuating levels responsive to the average values of the pulse signal; and pulse shaping means produces said binary output signal at said first voltage level upon the filtered signal amplitude increasing above a first reference value when the input signal is at said first frequency, and produces said binary output signal at a second voltage level upon the filtered signal amplitude decreasing below a second reference value when the input signal is at said second frequency.

8. The decoder of Claim 7 wherein the offsetting circuit means is connected to the pulse shaping means and controls the magnitude of the first and second reference values.

* * * * *